Figure 1:
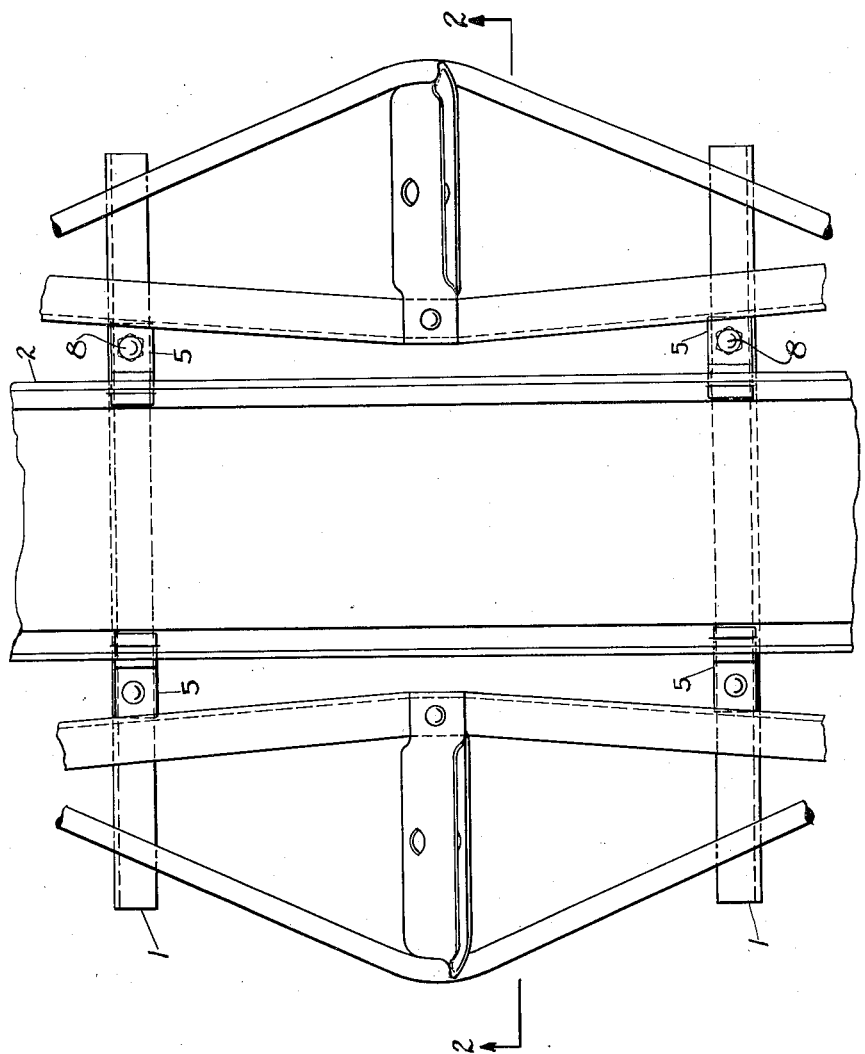

June 18, 1935.   H. C. DIXON   2,005,076
RAILWAY BRAKE BEAM SUPPORT
Filed Jan. 12, 1932   2 Sheets-Sheet 1

INVENTOR
Harold C. Dixon
BY
ATTORNEY

June 18, 1935.    H. C. DIXON    2,005,076
RAILWAY BRAKE BEAM SUPPORT
Filed Jan. 12, 1932    2 Sheets-Sheet 2
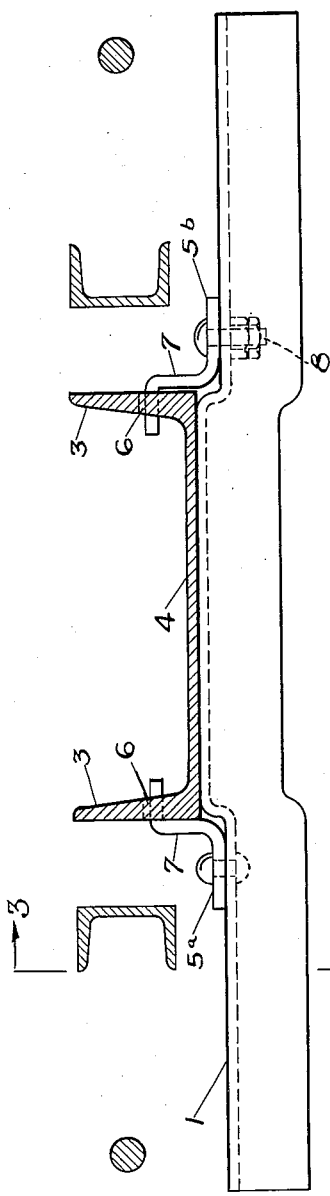
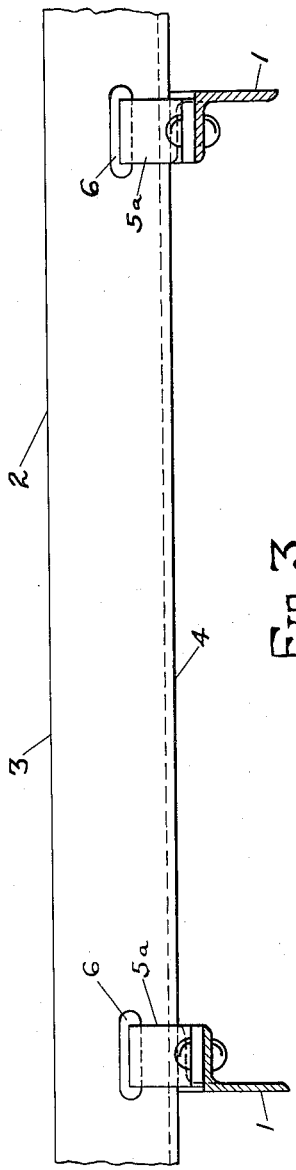
INVENTOR
Harold C. Dixon
BY
ATTORNEY Patented June 18, 1935

2,005,076

UNITED STATES PATENT OFFICE 2,005,076

RAILWAY BRAKE BEAM SUPPORT

Harold C. Dixon, Chicago, Ill., assignor to Pressed Steel Car Company, Pittsburgh, Pa., a corporation of New Jersey Application January 12, 1932, Serial No. 586,126

1 Claim. (Cl. 188—210)

My invention pertains to supports for brake beams of railway cars, particularly those emergency supports which are normally idle and the means for securing same in place upon the spring plank or other parts of the car truck.

It sometimes happens that brake beam mechanisms of railway cars become detached from their mountings by reason of breaking of parts or loss thereof and to prevent accidents or serious damage, safety supports are provided for the brake beam. These are usually structural or cast members of various forms and are secured to the truck spring plank and extend longitudinally of the truck beneath the brake beams.

An object of my invention is to provide an emergency support and brackets for securing same to the truck requiring a minimum of space for attachment.

Another object of my invention is to provide a mounting bracket which is simple in construction, strong, and economical to manufacture, and which can be easily and quickly assembled.

In the drawings accompanying this description, Fig. 1 is a fragmentary plan view of a railway car truck showing the relation of the brake mechanism to one form of my invention; Fig. 2 is a section taken along the lines 2—2 of Fig. 1; Fig. 3 is a section along the lines 3—3 of Fig. 2.

In the embodiment of my invention as shown in Figs. 1 and 2 of the drawings the safety support 1 is mounted upon a spring plank 2 having side flanges 3 and a connecting web 4. Brake beams are shown extending longitudinally of the spring plank. The safety support 1 is secured to the spring plank by means of brackets 5 which are fastened to the safety bar and inserted through slots 6 in the spring plank flanges 3. In Fig. 2 it will be observed that the web 7 of the brackets 5 embraces the spring plank and one bracket 5a is secured rigidly to the safety support, the other bracket 5b being movably mounted thereon. This method permits of rapid assembly and reduces the number of loose parts. Obviously either or both of these brackets 5 can be movably mounted on the safety support and the safety support can be of any desired contour.

In assembling the safety support on the spring plank the operation is as follows: the safety bar 1 with the bracket 5a rigidly secured thereto is inserted longitudinally of the truck with the free flange of the bracket 5a engaging the slot 6 in the flange 3 of the spring plank. The other bracket 5b is then inserted with one end through the slot 6 in the flange 3 of the spring plank and a bolt 8 passed through the opening in the bracket 5b and safety bar 1. A standard nut and a lock nut are usually placed upon the bolt 8 in order to guard against loss of the bolt 8.

Having thus described the invention, what I claim as new and desire to secure by Letters Patent is:

In a railway car truck a spring plank, a brake beam safety support beneath said spring plank, oppositely disposed angular members mounted on said safety support and aligned slots in said spring plank for receiving said angular members, one of said members being rigidly secured to said support and the other being movably mounted to permit attachment of said safety support.

HAROLD C. DIXON.